US012675382B1

(12) United States Patent　　　　(10) Patent No.: US 12,675,382 B1

Gopalakrishnan et al.　　　　(45) Date of Patent:　Jul. 7, 2026

(54) CLOUDLAKE REAL-TIME SINGLE OPERATIONAL VIEW QUERY AND RESOURCE MONITORING

(71) Applicant: Teradata US, Inc, San Diego, CA (US)

(72) Inventors: Sudarshan Gopalakrishnan, San Marcos, CA (US); Vimalraj Panneerselvam, San Diego, CA (US); John Douglas Frazier, Romona, CA (US)

(73) Assignee: Teradata US, Inc., San Diego, CA (US)

( * ) Notice: Subject to any disclaimer, the term of this patent is extended or adjusted under 35 U.S.C. 154(b) by 418 days.

(21) Appl. No.: 18/400,802

(22) Filed: Dec. 29, 2023

(51) Int. Cl.
　　　*G06F 15/16*　　　(2006.01)
　　　*G06F 11/30*　　　(2006.01)
　　　*G06F 11/34*　　　(2006.01)
(52) U.S. Cl.
　　　CPC ...... *G06F 11/3409* (2013.01); *G06F 11/3075* (2013.01)
(58) Field of Classification Search
　　　CPC .......................... G06F 11/3075; G06F 11/3409
　　　USPC ......................................................... 709/224
　　　See application file for complete search history.

(56) References Cited

U.S. PATENT DOCUMENTS

| | | | | |
|---|---|---|---|---|
| 8,407,414 | B2 * | 3/2013 | Takeda | G06F 3/061 |
| | | | | 709/224 |
| 8,549,050 | B2 * | 10/2013 | Ohata | G06F 11/3495 |
| | | | | 702/182 |

| | | | | |
|---|---|---|---|---|
| 9,264,499 | B2 * | 2/2016 | Li | H04L 67/1097 |
| 9,716,756 | B2 * | 7/2017 | Li | H04L 67/52 |
| 10,594,791 | B2 * | 3/2020 | Li | H04L 67/5682 |
| 11,216,352 | B2 * | 1/2022 | Park | G06F 11/3006 |
| 11,301,517 | B2 * | 4/2022 | Liu | G06F 9/3838 |
| 11,461,330 | B2 * | 10/2022 | Kalathuru | G06F 16/27 |
| 11,841,840 | B2 * | 12/2023 | Kruempelmann | G06F 16/2379 |
| 11,886,455 | B1 * | 1/2024 | Baskaran | G06F 16/248 |
| 12,189,512 | B2 * | 1/2025 | Guim Bernat | H04L 43/08 |
| 2014/0173089 | A1 * | 6/2014 | Li | H04L 67/52 |
| | | | | 709/224 |
| 2016/0337451 | A1 * | 11/2016 | Li | H04L 41/18 |
| 2018/0103099 | A1 * | 4/2018 | Li | H04L 67/52 |
| 2020/0210307 | A1 * | 7/2020 | Park | G06F 11/3447 |

(Continued)

*Primary Examiner* — Moustafa M Meky

(74) *Attorney, Agent, or Firm* — Howard Speight

(57)　　　　ABSTRACT

A data warehouse executes as at least one of a plurality of processes on a primary cluster. The data warehouse issues executable steps to processes executing on a compute cluster. The data warehouse receives a performance monitoring (PM) query from a client requesting data warehouse performance monitoring information. A single operational view performance monitoring application program interface (SOVPMAPI) executing on the primary cluster converts the performance monitoring query into a call to a federator application program interface (FAPI) to gather data warehouse performance monitoring information requested in the performance monitoring query. The FAPI requests database performance monitoring information from fast path performance monitoring application program interfaces (FPPMAPIs) executing on the primary cluster and the compute cluster, receives the requested data warehouse information, compiles a response to the call from the SOVPMAPI, and sends the compiled response to the SOVPMAPI, which prepares a result set and provides it to the client.

20 Claims, 7 Drawing Sheets

(56)             References Cited

U.S. PATENT DOCUMENTS

| | | |
|---|---|---|
| 2020/0210412 A1* | 7/2020 | van Gulik ............. G06F 9/4881 |
| 2020/0241999 A1* | 7/2020 | Guim Bernat ...... G06F 11/3419 |
| 2021/0037097 A1* | 2/2021 | Li ....................... H04L 67/1097 |
| 2022/0188282 A1* | 6/2022 | Kruempelmann ........................... G06F 16/24558 |

* cited by examiner

SQL
QUERY

108

SESSION CONTROL

200

PARSER

205

QUERY EXECUTION PLAN
COST ESTIMATES

SQL
QUERY

205

INTERPRETER

300

SYNTAX CHECKER

305

SEMANTIC CHECKER

310

DATA DICTIONARY CHECKER

315

OPTIMIZER

320

QUERY EXECUTION PLAN
COST ESTIMATES

CLOUDLAKE REAL-TIME SINGLE OPERATIONAL VIEW QUERY AND RESOURCE MONITORING

BACKGROUND

A cloud-based data warehouse provides the ability to plan and distribute query execution among processors scattered in the cloud based on the location of the data to be used in the processing. Monitoring resource usage and tracking query execution progress across a cloud-based data system is a challenge.

SUMMARY

In one aspect, a method includes executing a plurality of processes in a CloudLake tenant. The CloudLake tenant includes a primary cluster executing a single operational view performance monitoring application program interface (SOVPMAPI), a compute cluster, a federator compute cluster executing a federator application program interface (FAPI), and a cloud object storage. The primary cluster and the compute cluster each execute a fast path performance monitoring application program interface (FPPMAPI), wherein each FPPMAPI provides performance monitoring information regarding only the respective cluster it is executing on. A data warehouse executes as at least one of a plurality of processes on the primary cluster. The data warehouse is configured to issue executable steps to processes executing as part of the data warehouse on the compute cluster. The data warehouse receives a performance monitoring (PM) query from a client requesting data warehouse performance monitoring information. The SOVP-MAPI converts the performance monitoring query into a call to the FAPI to gather the data warehouse performance monitoring information requested in the performance monitoring query. The FAPI requests database performance monitoring information from the FPPMAPIs, receives the requested data warehouse performance monitoring information, compiles a response to the call from the SOVPMAPI, and sends the compiled response to the SOVPMAPI. The SOVPMAPI prepares a result set and provides it to the client.

Implementations may include one or more of the following. A POD Agent may, upon request from the FAPI, provide a layout of the compute clusters. The data warehouse may receive a business request to execute and execute the business request on the CloudLake tenant, wherein execution of the PM query begins after execution of the business request. The result set prepared by the SOVPMAPI includes information regarding execution of the business request. The data warehouse may adjust execution of the business request in real time while the business request is executing in response to the performance information gathered by the PM query. The data warehouse may adjust the CloudLake tenant in response to the performance information gathered by the PM query. The data warehouse may adjust the CloudLake tenant by redistributing data among the primary cluster and the compute cluster to address issues identified in the performance information gathered by the PM query. The data warehouse may adjust the CloudLake tenant by changing resource allocations among the primary cluster and the compute cluster to address issues identified in the performance information gathered by the PM query. The performance monitoring query may be a Structured Query Language (SQL) query.

In one aspect, a non-transitory computer-readable tangible medium records a computer program. The computer program includes executable instructions, that, when executed, perform a method including executing a plurality of processes in a CloudLake tenant. The CloudLake tenant includes a primary cluster executing a single operational view performance monitoring application program interface (SOVPMAPI), a compute cluster, a federator compute cluster executing a federator application program interface (FAPI), and a cloud object storage. The primary cluster and the compute cluster each execute a fast path performance monitoring application program interface (FPPMAPI), wherein each FPPMAPI provides performance monitoring information regarding only the respective cluster it is executing on. A data warehouse executes as at least one of a plurality of processes on the primary cluster. The data warehouse is configured to issue executable steps to processes executing as part of the data warehouse on the compute cluster. The data warehouse receives a performance monitoring (PM) query from a client requesting data warehouse performance monitoring information. The SOVP-MAPI converts the performance monitoring query into a call to the FAPI to gather the data warehouse performance monitoring information requested in the performance monitoring query. The FAPI requests database performance monitoring information from the FPPMAPIs, receives the requested data warehouse performance monitoring information, compiles a response to the call from the SOVPMAPI, and sends the compiled response to the SOVPMAPI. The SOVPMAPI prepares a result set and provides it to the client.

In one aspect, a system includes a CloudLake tenant executing a plurality of processes. The CloudLake tenant includes a primary cluster executing a single operational view performance monitoring application program interface (SOVPMAPI), a compute cluster, a federator compute cluster executing a federator application program interface (FAPI), and a cloud object storage. The primary cluster and the compute cluster each execute a fast path performance monitoring application program interface (FPPMAPI). Each FPPMAPI provides performance monitoring information regarding only the respective cluster it is executing on. A data warehouse executes as at least one of a plurality of processes on the primary cluster. The data warehouse is configured to issue executable steps to processes executing as part of the data warehouse on the compute cluster. The data warehouse receives a performance monitoring (PM) query from a client requesting data warehouse performance monitoring information. The SOVPMAPI converts the performance monitoring query into a call to the FAPI to gather the data warehouse performance monitoring information requested in the performance monitoring query. The FAPI requests database performance monitoring information from the FPPMAPIs, receives the requested data warehouse performance monitoring information, compiles a response to the call from the SOVPMAPI, and sends the compiled response to the SOVPMAPI. The SOVPMAPI prepares a result set and provides it to the client.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

An Example Computer System

Figure 1:
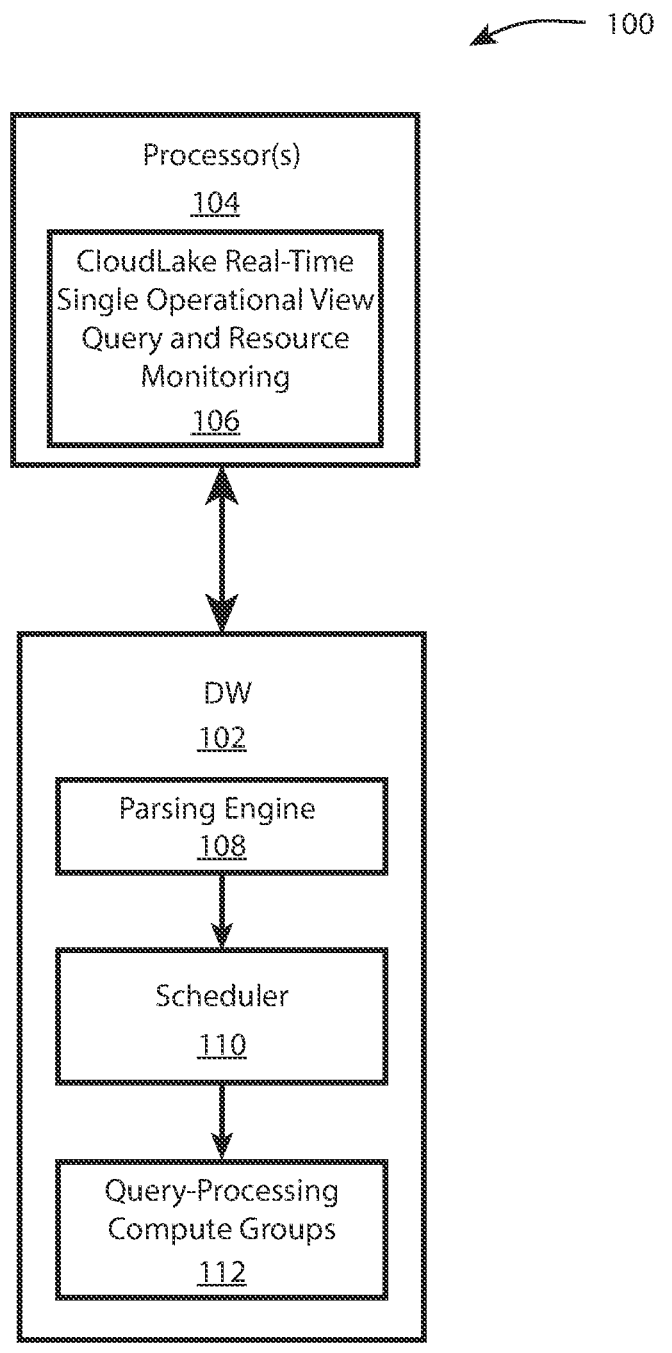
FIG. 1 is one example of a block diagram of a computer system.

The techniques disclosed herein have particular application to, but are not limited to, systems such as the system 100 illustrated in FIG. 1. The system 100 includes a variety of hardware components and software components that may be deployed on an appliance, on commodity hardware, in a private cloud, in a public cloud, in a combination of public and private clouds, and/or in a multi-cloud where cloud users are allowed services from multiple cloud vendors such as Amazon (AWS), Google (GCP), and Microsoft (Azure). The software components are programmed as executable instructions into memory and/or a non-transitory computer-readable medium for execution on the hardware components (including, for example, hardware processors). System 100 includes one or more network connections; the networks can be wired, wireless, or a combination of wired and wireless.

The system 100 implements, among other things, the processing described below in connection with FIGS. 1-9.

An Example Database Management System

The system 100 includes a data warehouse (DW) 102, at least one hardware processor 104, and a non-transitory computer-readable storage medium having executable instructions representing CloudLake real-time single operational view query and resource monitoring 106, as disclosed herein. The DW 102 may be a distributed data system, such as the VantageCloudLake™ offered by Teradata Corporation.

The DW 102 may be a relational DW (RDW) or it may be another variety of database management system. The DW 102 may include a parsing engine 108, discussed below in connection with FIGS. 2 and 3, that organizes the storage of data and the distribution of database table rows and coordinates the retrieval of data from the data-storage facilities in response to queries received from a user. The DW 100 usually receives queries and commands to build tables in a standard format, such as Structured Query Language (SQL).

The DW 102 also includes a scheduler 110 that makes decisions about when (i.e., immediately or delayed) and where executable steps to process a query are to be executed. The DW 102 also includes query-processing compute clusters 112, that process the query and produce a result. The compute clusters 112 provide the ability to scale the DW 102. In a data lake system, such as DW 102, the data may not necessarily be managed by the same company that provides the primary cluster (discussed below), but the data can be anywhere and can be managed by anyone. The data can be processed as long as it is accessible via, for example, network or Internet connections.

Figure 2:
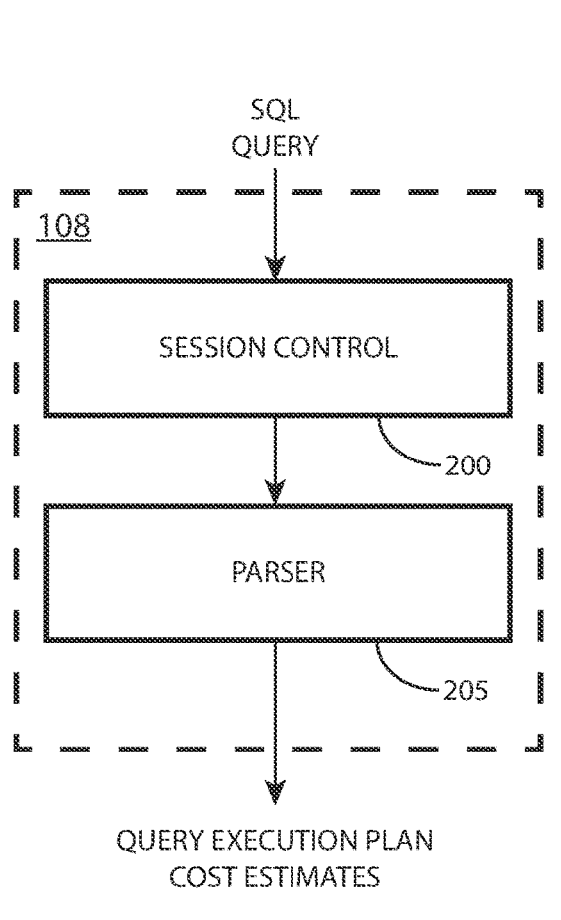
FIG. 2 is one example of a block diagram of a parsing engine.

The parsing engine, shown in FIG. 2, includes a session control 200 that allows a session to begin and a user to submit a SQL query. More broadly, the user may submit a "request," a term that includes database query, which is processed by the DW to produce an output result, and other DW actions, such as load utilities to load data from a source to a target, etc. Typically, a query includes one or more predicates. Query predicates, or logical predicates, are types of conditional expressions that specify a condition of a row or group of rows that has one of three possible states: TRUE, FALSE, or NULL (or unknown).

Figure 3:
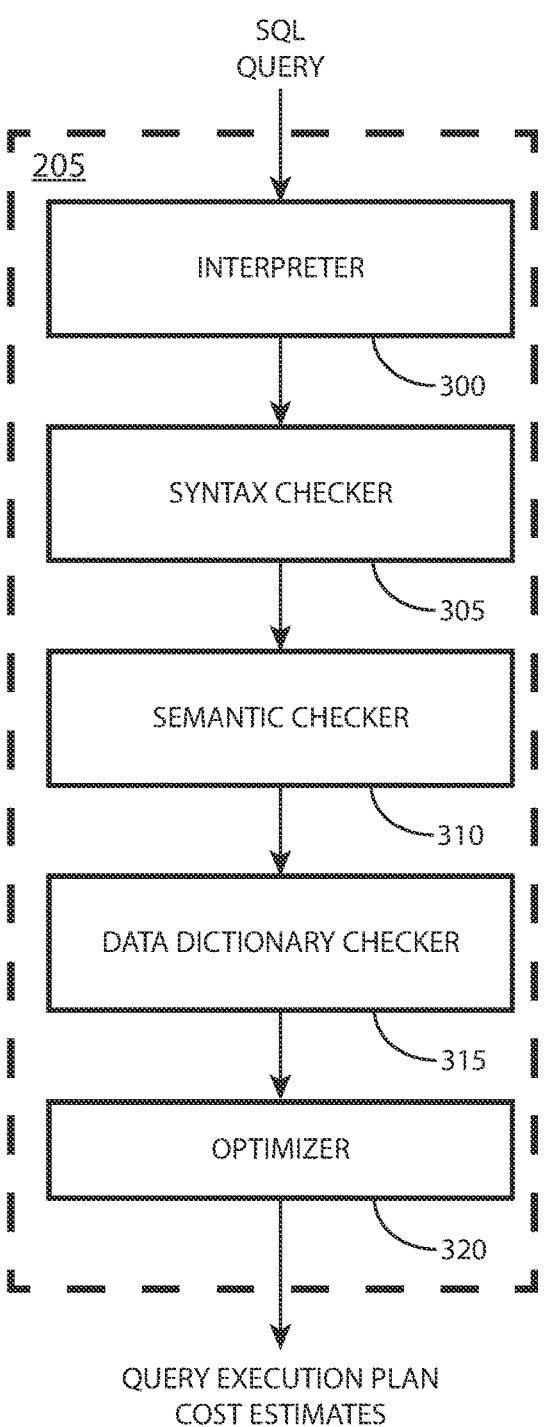
FIG. 3 is one example of a block diagram of a parser.

The SQL query is routed to the parser 205. As illustrated in FIG. 3, the parser 205 interprets the SQL query 300, checks it for proper SQL syntax 305, evaluates it semantically 310, and consults a data dictionary to ensure that all the objects specified in the SQL query actually exist and that the user has the authority to perform the request 315. Finally, the parser 205 runs an optimizer 320, which develops a query execution plan (QEP) to perform the query and produces cost estimates, where the term "cost" in this context has different dimensions, namely time, resource usage, and financial.

Returning to FIG. 1, the scheduler 110 produces executable steps to process the query. These executable steps are sent to query-processing compute clusters 112 (compute clusters are discussed below) for execution.

A "workload group" (or alternatively "workload") is a set of requests that have common characteristics, such as an application that issued the requests, a source of the requests, type of query, priority, response time goals, throughput, etc. A workload group is defined by a workload definition (WD), which defines characteristics of the workload group as well as various rules associated with the workload group.

An Example Cloud-Based Processing System

Figure 4:
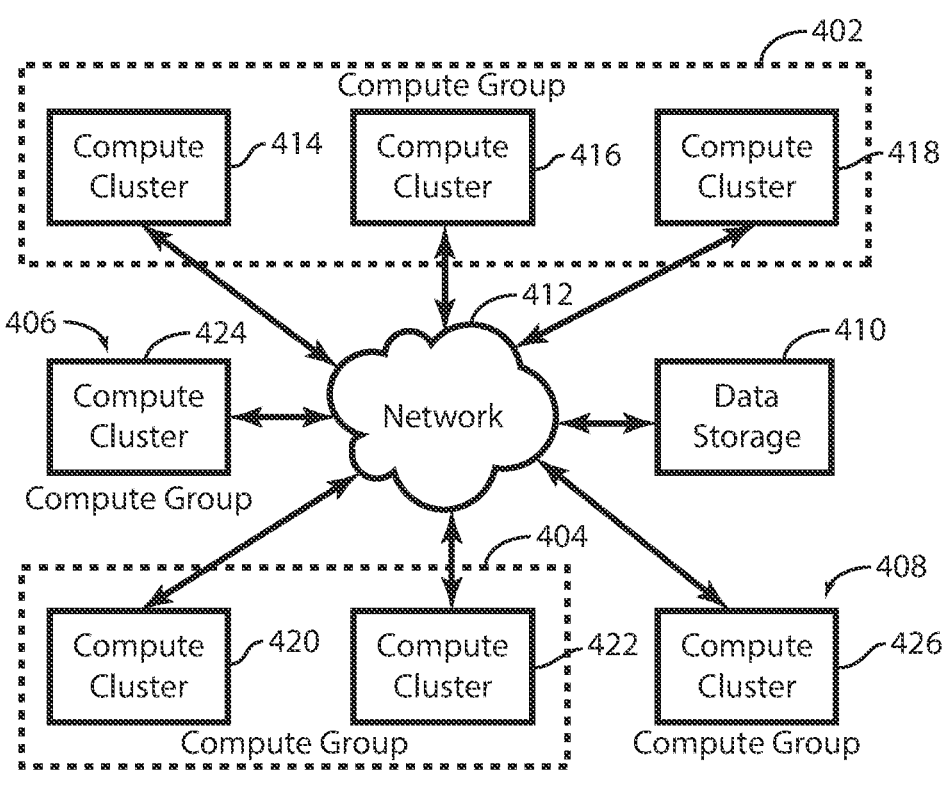
FIG. 4 illustrates a cloud-based processing system.

FIG. 4 illustrates a cloud-based processing system. A cloud-based processing system 400 includes one or more compute groups 402, 404, 406, 408 that communicate with a data storage 410 through a network 412. A compute group is defined as a collection of one or more compute clusters (discussed below in connection with FIG. 5). A compute group's usage may be designated for a particular department or application of an enterprise. For example:

compute group 402, which might be dedicated to the enterprise's Sales department, includes compute clusters 414, 416, and 418, compute group 404, which might be dedicated to the enterprise's market-research application, includes compute clusters 420 and 422, compute group 406, which might be dedicated to the enterprise's Security department, includes compute cluster 424, and compute group 408, which might be dedicated to the enterprise's Engineering department, includes compute cluster 426.

Alternatively, a compute group may be used by multiple departments within an enterprise or by multiple enterprises.

Data storage 410 may include cloud-based object storage, such as Amazon Simple Storage Service (S3) or the Azure Blob Storage, or it may be a data storage system local to the enterprise or a combination of local and cloud-based storage.

Figure 5:
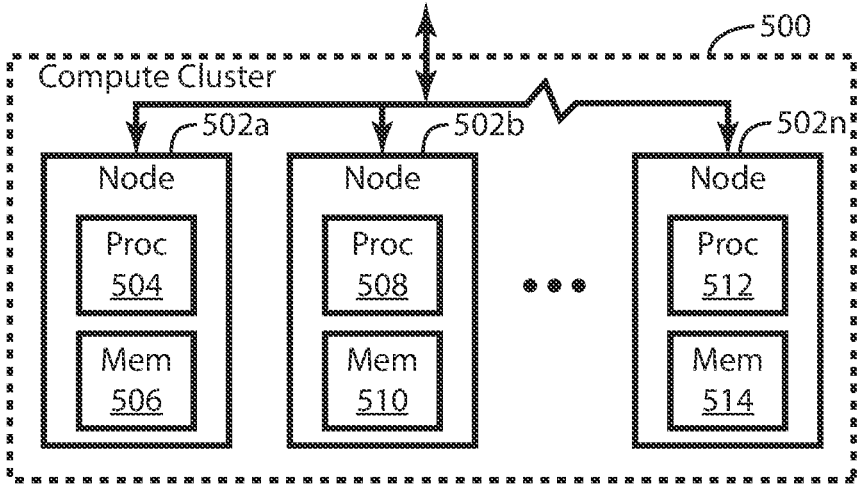
FIG. 5 illustrates a compute cluster.

FIG. 5 illustrates a compute cluster. A compute cluster 500 may be a complete full-featured database, such as that provided by Teradata Corporation, able to process queries. Each compute cluster 500 includes one or more nodes 502*a*, 502*b*, . . . , 502*n*. Each node includes a processor and memory. For example:

node 502*a* includes processor 504 and memory 506, node 502*b* includes processor 508 and memory 510, and node 502*n* includes processor 512 and memory 514.

Each node 502*a*, 502*b*, . . . , 502*n* may be local to the enterprise or it may be cloud based. If cloud based, the processor and memory may be any of the processor/memory configurations offered by the cloud provider.

Teradata Corporation's VantageCloud Lake

Figure 6:
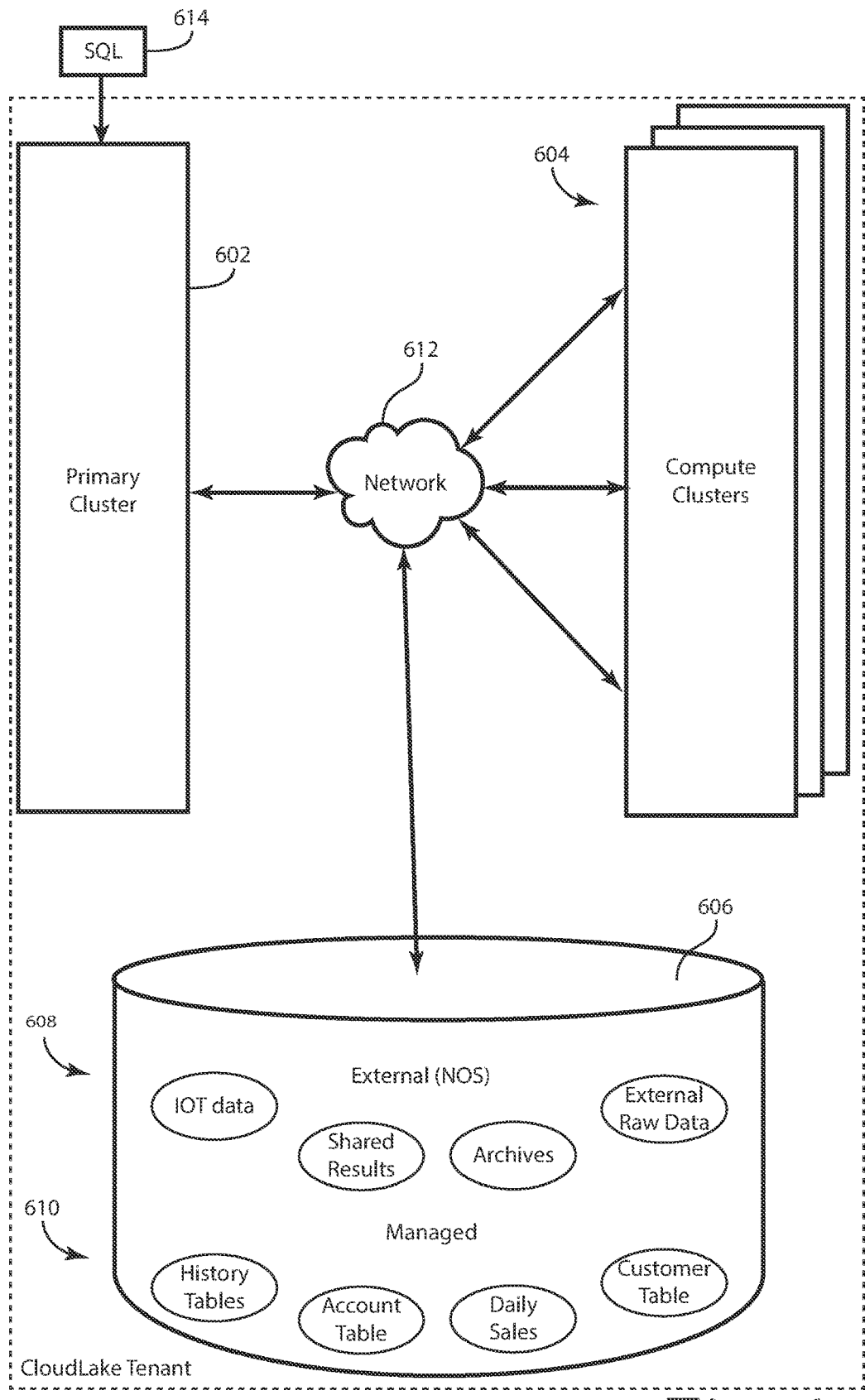
FIG. 6 is a block diagram of a CloudLake tenant in a VantageCloud Lake database environment provided by Teradata Corporation.

FIG. 6 is a block diagram of a CloudLake tenant in a VantageCloud Lake database environment provided by Teradata Corporation. A CloudLake tenant generally provides processing and data storage for a single client. Further, while a client may only use a single CloudLake tenant, one client may have reason to use more than one CloudLake tenants. For example, a client with more than one business may use one CloudLake tenant for one of its businesses and another CloudLake tenant for another of its businesses.

The major components of the CloudLake tenant in the VantageCloud Lake database environment, which is a special case of the cloud-based processing system illustrated in FIG. 4, include:

a primary cluster 602, forms the hub of the system environment housed on a cluster such as that illustrated in FIG. 5 and providing much of the functionality illustrated in FIGS. 1-3, i.e., acting as a "brain" to maintain persistent user data and to distribute query processing to the compute clusters 604, and which is able to perform its own database processing, especially for tactical queries that have time-based service level agreements (SLAs);

optional additional compute clusters 604, which are independent compute resources used to offload compute-intensive query steps from primary cluster 602, that are scalable and can come and go as load varies; each of the additional compute clusters 604 is housed on a compute cluster such as illustrated in FIG. 5, cloud object storage 606, housed on a data storage such as data storage 410 illustrated in FIG. 5, which houses data consisting of:

data in external object storage 608 accessed using native object store (NOS) and owned and managed outside the database, and managed data 610 such as user tables, especially large tables, that are part of the database and can be shared by all compute clusters 602, 604, but are stored in cloud storage to reduce storage costs, a parallel, scalable network connection 612 that provides connectivity between the primary cluster 602 and the multiple compute clusters 604, where queries land on a compute cluster if the database-user source of the query has access to that compute cluster (i.e., not all queries can land on all compute clusters), and a request (or query) 614 being submitted for processing. Distributed data systems, such as Teradata's Vantage-Cloud Lake, may plan query execution across many compute clusters. This may mean critical resource consumption and query execution information is spread across these compute clusters. The techniques described herein gather information from across these clusters in real-time, using a federator service, and provides SQL interfaces for a single operational view of the gathered information. Users of such distributed data systems may then make use of this information to make decisions such as the following:

Monitoring query sessions and optimizing query execution to save costs in using the distributed database, Autoscaling compute clusters using resource information for optimal query execution performance, and Proactively addressing query execution issues by monitoring issues with query execution and resource usage.

The techniques described herein provide a single operational view of monitoring functionality by federating requests and collating information from multiple compute clusters. The techniques use Single Operational View Application Program Interfaces (APIs) that provide the services in the following non-exhaustive list:

Tracking resource usage while a query is running across multiple compute clusters, Displaying basic configuration information across the compute clusters, Identifying status of all nodes by compute cluster, Identifying all connected sessions across the compute clusters, Identifying sessions that are blocked, and Tracking query execution among compute clusters and tracking query execution progress.

Figure 7:
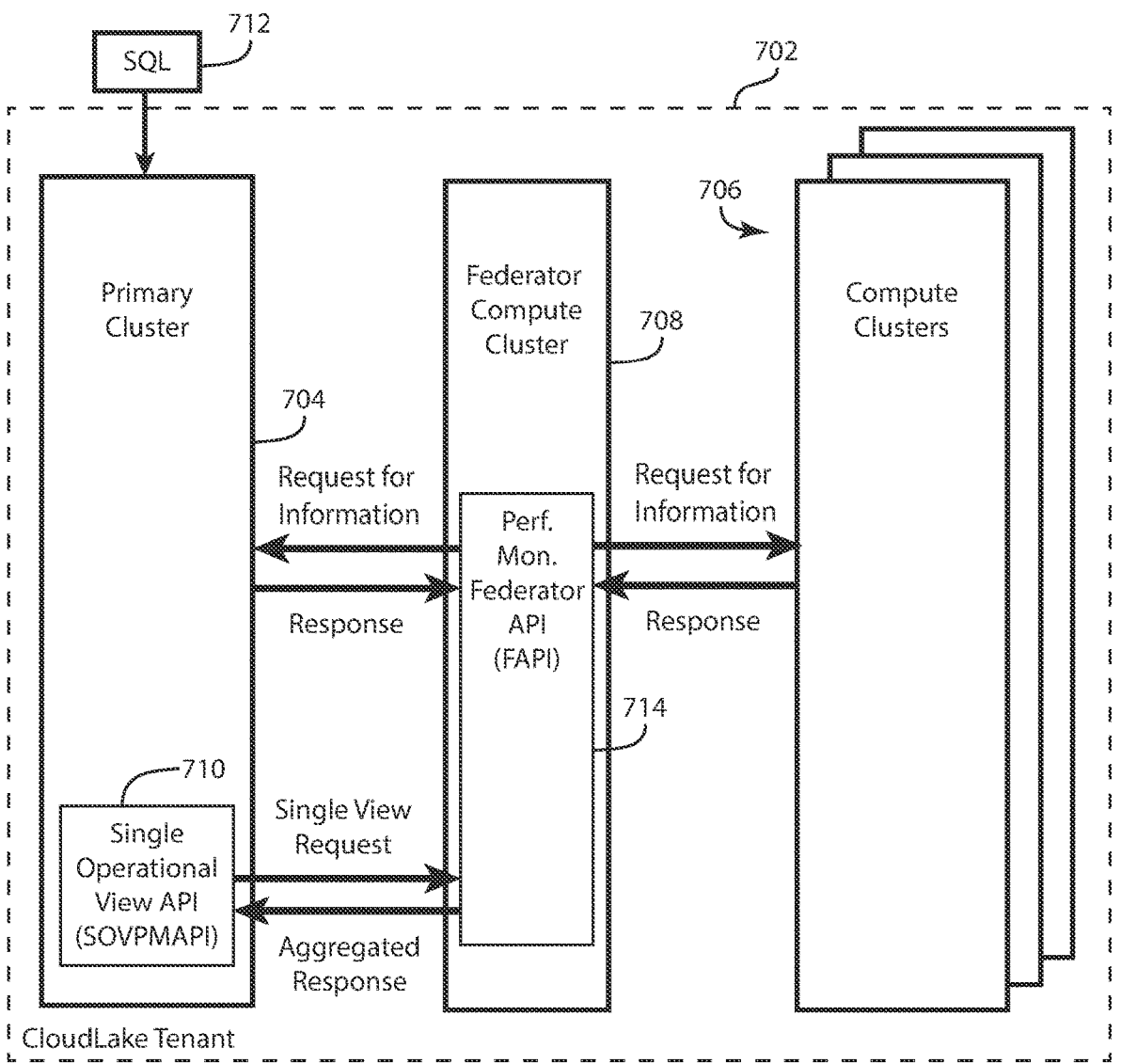
FIG. 7 illustrates a block diagram of a CloudLake tenant in a VantageCloud Lake database environment using a federator service.

FIG. 7 illustrates a block diagram of a CloudLake tenant in a VantageCloud Lake database environment using a federator service. The CloudLake tenant 702 illustrated in FIG. 7 may be one of multiple such tenants hosted on a cloud-based processing system.

The CloudLake tenant 702 includes:

a primary cluster 704, which is similar to the primary cluster 602, described above in connection with FIG. 6;

a set of optional additional compute clusters 706, which are similar to the compute clusters 604, described above in connection with FIG. 6;

a federator compute cluster 708, which may be one of the optional compute clusters 604, described above in connection with FIG. 6;

cloud object storage (not shown in FIG. 7), which may be similar to the cloud object storage 606, described above in connection with FIG. 6; and a network (not shown in FIG. 7), which may be similar to the network 612, described above in connection with FIG. 6.

It will be understood that these data flows illustrated in FIG. 7 may be through a network, such as network 612, described above in connection with FIG. 6. It will also be understood that the CloudLake tenant 702 illustrated in FIG. 7 interfaces with a cloud object storage, such as cloud object storage 606, described above in connection with FIG. 6. Further, it will be understood that, while FIG. 7 shows the functions of the primary cluster 704, the optional additional compute clusters 706, and the federator compute cluster 708 being performed by different compute clusters, it is possible that some or all of these functions can be performed by a smaller set of compute clusters.

A single operational view application program interface (API) 710 (hereinafter "SOVPMAPI") residing in the primary cluster 704 provides the ability to compile and report information concerning the operation of the CloudLake tenant 702 as requested in SQL requests 712 submitted to the primary cluster 704 by a client. Examples of such SQL requests are listed below.

As can be seen, the SOVPMAPI 710 submits a single view request from the primary cluster 704 to a performance monitoring federator API 714 (hereinafter "FAPI") in the federator compute cluster 708. The single view request solicits information necessary to respond to the SQL query 712. The FAPI 714 sends a request for information to each of the compute clusters 706 and to the primary cluster 708, each of which responds with the requested information about their respective cluster. The federator compute cluster's 708 FAPI compiles the responses from the compute clusters 706 into an aggregated response which it delivers to the SOVPMAPI 710. The primary cluster 704 presents the user with a response to the SQL query 712 based on the aggregated response from the federator compute cluster 708.

Figure 8:
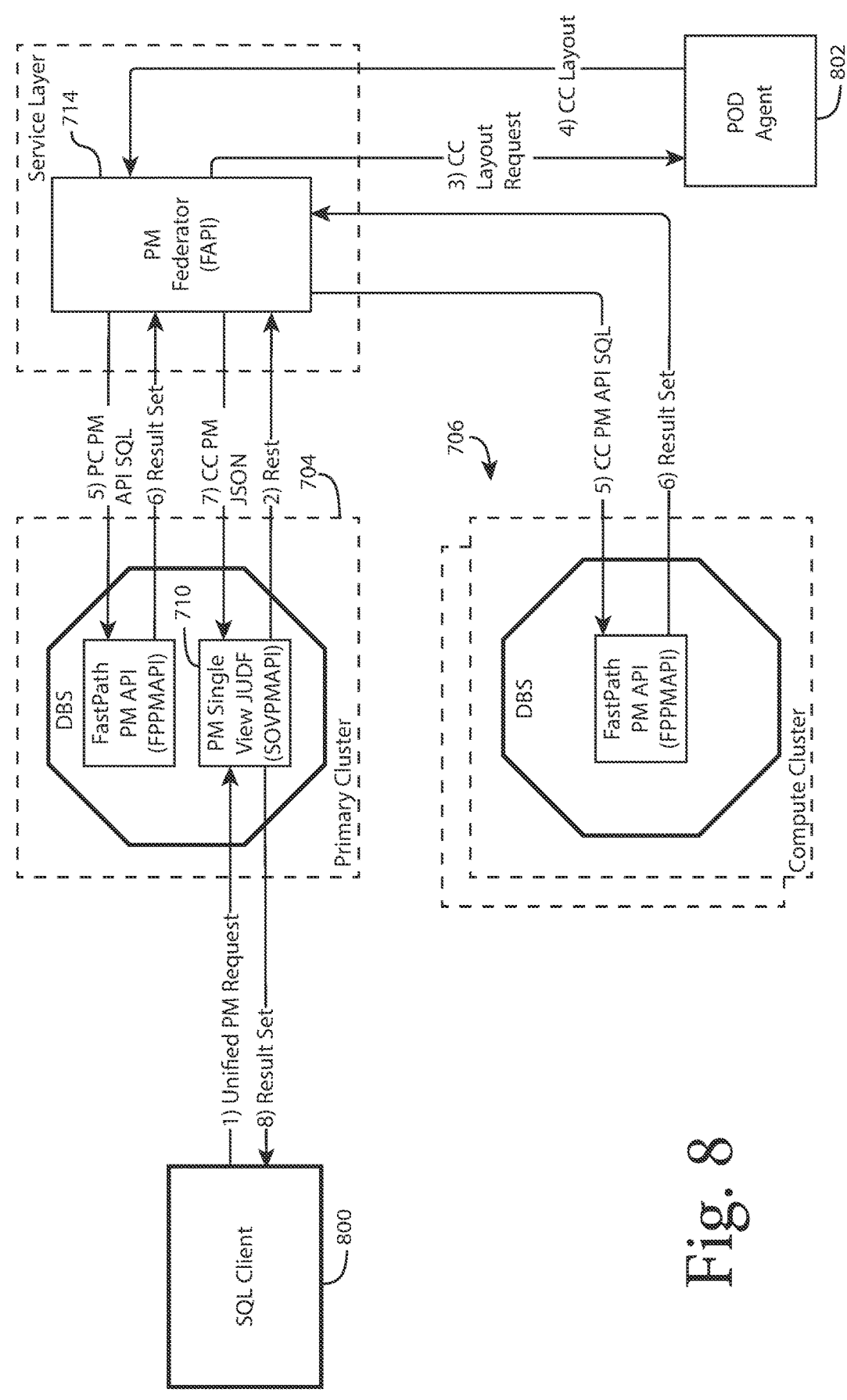
FIG. 8 provides a data flow diagram showing the flow of data in responding to a request for operational information.

FIG. 8 provides a data flow diagram showing the flow of data in responding to a request for operational information. The data flows are numbered in FIG. 8. The following discussion is keyed to those numbers.

1) Unified PM Request

A SQL client 800 submits a Unified Performance Monitoring (PM) Request, in the form of a SQL query, such as one of those listed below. A SQL client is any client capable of executing SQL queries on the primary cluster 704, including Teradata clients, such as BTEQ or Teradata Studio, or external non-Teradata clients, such a DBEAVER.

For example, the SQL client 800 may send the following SQL request to the primary cluster 704:

```
SELECT * from SYSLIB.MonitorPhysicalResourceSV(
    USING
    details('1')
    )
    AS dt;
```

Note that this query is the same as the first query listed below except that in the example all columns are requested ("SELECT *") rather than just a few columns in the first query listed below. The example query requests all columns from the SYSLIB.MonitorPhysicalResourceSV object.

2) Rest

The primary cluster 704 recognizes the example query as one that will be processed by the SOVPMAPI 710. The submitted SQL query is processed by the SOVPMAPI 710 to generate a call to the federator service (PM Federator) 708. Typically, the call will be in the form of a RESTful request, which allows specification of input and output parameters.

Using the above example, the SOVPMAPI 710 may generate the following RESTful request:

{address of PM federator}?api=MonitorPhysicalResource
  where:
    the "address of the PM federator" may include a full internet protocol address, including an identifier of the CloudLake tenant where the primary cluster 704, the compute clusters 706, and the federator compute cluster 708 reside, and
    the ?api=MonitorPhysicalResource is a query parameter for the RESTful request that specifies the application program interface to be run, i.e., Monitor-PhysicalResource.

The RESTful request may specify other query parameters as needed for the query to be run. For example, the RESTful request may include parameters, such as input parameters. Such parameters are not required for the MonitorPhysical-Resource API described above, but such parameters are required for a MonnitorSessionsSV API, as requested by the following SQL query:

```
SELECT * from MonitorSessionSV(
    USING
    hostId('-1')
    12escry12e('*')
    sessionId('0')
    details('1')
    )
    AS dt;
```

The three variables specified in the "USING" clause of the SQL query would be converted to parameters in the RESTful request, as shown below:

{address of PM federator}?api=MonitorSessionSV&hostID=−1&username=*&sessionId=03) CC Layout Request The PM Federator 708, upon receipt of the call from the PM Federator 708, sends a RESTful request to a Point of Deployment (POD) agent 802 to request the topology (i.e., the compute clusters 706 and the primary cluster 704) available to the CloudLake Tenant. The RESTful request to the POD agent 802 may be an API request to the IP address of the POD agent 802, assuming that the POD agent 802 is dedicated to the CloudLake tenant where the primary cluster 704, the compute clusters 706, and the federator compute cluster 708 reside.

4) CC Layout

The POD agent 802 responds with a JavaScript Object Notation (JSON) payload that has information regarding the compute clusters 706 and the primary cluster 704, such as IP addresses, names, and ids.

5) CC PM API SQL and PC PM API SQL

The PM Federator 708 requests relevant information for all compute clusters 706 (CC PM API SQL) and the primary cluster 704 (PC PM API SQL). The requests are directed to FastPath PM APIs (hereinafter FPPMAPI) resident in each cluster that will respond with performance monitoring information regarding only the cluster where it resides; the FPPMAPI does not provide information of any kind about other compute clusters. The request may be in the form of a SQL query through Java Database Connectivity (jdbc/gosql) drivers.

Following the example from above, the request may be as follows:

SELECT t2.* from table (MonitorPhysicalResource( )) as t2;

This SQL query requests a table with the results of the MonitorPhysicalResource( ) object, which is the FPPMAPI.

6) Result Set

Each FPPMAPI in the primary cluster 704 and the compute clusters 706 responds to the FAPI with a table containing rows and columns of the requested performance monitoring information.

Following the example above, the primary cluster may respond with the following result set:

```
ProcId|Status|AmpCount|PECount|CPUUse   |PrcntKernel
|PrcntService|PrcntUser  |DiskUse   |DiskReads|DiskWrites|DiskOutReqAvg|NetAUse
|NetBUse|NetReads|NetWrites|CICUse|HstBlkRds|HstBlkWrts|MemAllocates|MemAllocateKB|
MemFailures|MemAgings|NVMemAllocate|NVMemAllocSegs|NVMemAgings|NetAUp|NetBUp|
VProcCount|SegSizeMBperVProc|SegCurrAvailMBperVProc|
|------|------|--------|------|------------|------------|------------|------------|---------|----------|-----------
--|--------|------|--------|---------|------|---------|----------|------------|-------------|-----------|---------|-------------
|--------------|-----------|------|------|----------|-----------------|----------------------|
|10,001|U   |12   |2   |2.1164550212|0.197480252 |0.477139786
|1.6393152351|2.4142823813|1,213  |48,746  |0.0124818771
|0  |0   |64,316 |69,319 |0  |1,919   |2,162   |0      |176   |0    |0    |0    |0
     |0    |U  |U  |18  |3,640   |3,324       |
|10,002|U   |12   |2   |1.701079892
|0.1914391894|0.3894402226|1.3116396694|2.4490408102|1,280   |47,281   |0.0120962078
|0.003333|0   |45,824 |80,478 |0  |1,820   |2,076   |0      |1,128 |0    |0    |0
|0      |0      |U  |U  |18  |3,640   |3,331       |
```

The compute clusters 706 will respond with similar information.

7) CC PM JSON

The FAPI 714 collates all these responses and generates 20 with a JSON payload which it sends to the SOVPMAPI. Following the example above, the JSON payload may be as follows:

{"columns":["ProcId","Status","AmpCount","PECount","CPUUse","PrcntKernel","PrcntService
","PrcntUser","DiskUse","DiskReads","DiskWrites","DiskOutReqAvg","NetAUse","NetBUse","
NetReads","NetWrites","CICUse","HstBlkRds","HstBlkWrts","MemAllocates","MemAllocateKB
","MemFailures","MemAgings","NVMemAllocate","NVMemAllocSegs","NVMemAgings","Net
AUp","NetBUp","VprocCount","SegSizeMBperVProc","SegCurrAvailMBperVProc"],"results": [{
"group":{"id":"pog-35232babb1","name":"tct-cl186084-cog-demo-01","type":"primary
cluster"},"rows":[["10001","U
","12","2","3.2265523447655236","0.1739409392394094","0.7352389761023898","2.49131
33686631337","1.91909380"9"5224","1207","454"8","0.012905637199469586","","000666"0
0006666","0","74348","89453","0","2435","2679","0","19132","0","0","0","0","0","U   ","U
","18","3640","3243"],["10002","U
","12","2","3.5601648168551648","0.1761282205112822","0.7852339766023397","2.774930
8402493083","1"98980"0"98980""""2"5","5"69","0"0"2"53250"9"1"1"4"""""0"6"6"9"11
96731037","0","70726","111943","0","2453","2703","0","382368","0","0","0","0","0","U
","U                ","18","3640","3227"]]},{"group":{"id":"sys-
35232b67ef_computegroup8_computeprofile20_r9niv6","name":"computegroup8-
computeprofile20-r9niv6","team":"computegroup8","type":"compute
cluster"},"rows":[["10001","U
","24","2","2.9474978026807297","0.0885794330916282","0.7718083937596133","2.17568
94089211163","2.1130886984545523","745","6649","0.016022119680656265","0.07532247
434328218","0","11033","16517","""""43","46","0","-4.37146e+06","0","0","0","0","0","U
","U                ","32","8192","7889"],["10002","U
","24","2","2.7995220830586685","0.083429466605141727","0.7697484069435289","2.0297
736761151395""2.069142313044752","749","6398","0.016992602358456017","0.10076738
237345942","0","10411","13845","0","54","60","0","-4.393352e+06","0","0","0","0","0","U
","U                ","32","8192","7894"],["10003","U
","24","2","2.8338551966600747","0.09338606899582509","0.759105141727093","2.07475
00549329816","2"21929"4"31949"2","7"5"""""74""""""".1986742840401"7"3","0"0"9"3"4"3"
3797469","0","11543","13907","0","56","60","0","-3.987796e+06","0","0","0","0","0","U
","U                ","32","8192","7894"],["10004","U
","24","2","3.0206273346517247","0.081026148099931882","0.7745550428477257","2.2460
72291803999","2"1185"199"63077"""""7"1","""2"6","0.0164249615469127"7","0.0669008195
350393"""0","1"135"""14"02","""""5""""""5""""""""""-4.15558e+06","0","0","0","0","0","U   ","U
","32","8192","7893"]]},{"group":{"id":"sys-
35232b67ef_computegroup7_computeprofile19_kdpk96","name":"computegroup7-
computeprofile19-kdpk96","team":"computegroup7","type":"compute
cluster"},"rows":[["10001","U
","24","2","0.4742661503058876","0.07787506314194308","0.15610091485659763","0.318
16523544929","1.5434697199304035","155","4313","0"0"1749"7"595349011","0.007939028
262940616","0","1912","3491","0","29","34","0","8","0","0","0","0","0","U         ","U
","32","8192","7896"],["10002","U
","24","2","0.46619801313352416","0.06980692596957962","0.17644665207386204","0.28
97513610596621","1.60"4"6763"5"0"0"","1"5"""""0"4","0"0"2"9"4"7"5"4"6"8"""""0","0"""""3
66","3391","0","29","3","0","8","0"""""","0","0","0","U"""""
","32","8192","7896"],["10003","U
","24","2","0.5303923219397204","0.07787506314194308","0.17083403491047874","0.359
5582870292417","1.66"076"25137"4"1"""""74","4"9"","0.0125909711698"6"03","0","0","182
9"""3"9"","0","28","32"""0","""""0","0"""""""""","0","U                        ","U
","3"""""8192","7899"],["10"0"","U
","24","2",""."1428"304"72228"6",""."77"7"0"3"4194308","0.132247"9"91221865","0.28203
40124600101","1.6650764251370411","159","4366","0.012216796692297619","0.01347073

-continued

48285849","""""2039","3590","0","5",""6","0"""""6","0","0","0","0",""""""U            ","U
","32","8192"""""900"]]},{"group":{""d":"s"s-
35232b67ef_computegroup8_computeprofile20_x2qwj""""nam""""computegroup8-
computeprofile20-x2qwj""""tea""""computegroup""""typ""""compute
cluste""}""row"":[""1000""""U""""2"""""""""3.914430859795098""""0.0739372842021848""""
0.850809418690213"""""3.06362144110488"",""5"116"84587"8"26""""3"6","1"255","0.02124
48821"2"3449","0.0733299112708073","0",""399"",""29"5"",""0","1","7"",""0","
−3.8944e+0""""""""""""""""""""""""U""""U""""3""""819""""789""],""1000""""U""""2"""""""""4.
16702043357672""""0.0799513216731759""""0.913426161770532""""3.2535942718061928
","5.3772570328861"2","302","11765","0.0"2"958038527575","0.0"2"54335260115""""""""2
4332","30669","""""48","52","0","
−3.879576e+0""""""""""""""""""""""""U""""U""""3""""819""""789""],""1000""""U""""2"""""
"3.927520235467255""""0.0813663893134091""""0.891138846436859""""3.0363813890303
9""""5.243297296277428""""28""""1184""""0.0211694118978887""""0.14266304347826086
"""","22651","28323","0","1"1","151","0","
−3.431148e+0""""""""""""""""""""""U""""U""""3""""819""""789""],""1000""""U""""2"""""""
"4.37291277523065""""0.0774749533027678""""0.914841229410765""""3.45807154581989
0""""5.203675402350899","282","11758","0.0216033659742269""""".0339696990284666""""
""""2518""""3236""""""""""6""""6"""""""""
−3.459288e+0""""""""""""""""""""""""U""""U""""3""""819""""789""]]}]}

20

8) Result Set

The PM Single View JUDF 710 provides the result to the client as a SQL result. Following the example above, the SQL result may be as follows:

|ProcId|Status|AmpCount|PECount|CPUUse   |PrcntKernel
PrcntService|PrcntUser   |DiskUse    |DiskReads|DiskWrites|DiskOutReqAvg|NetAUse
|netBUse|NetReads|NetWrites|CICUse|HstBlkRds|HstBlkWrts|MemAllocates|MemAllocateKB|
MemFailures|MemAgings|NVMemAllocate|NVMemAllocSegs|NVMemAgings|NetAUp|
NetBUp|vProcCount|SegSizeMBperVProc|SegCurrAvailMBperVProc|Type    |Id
    |Name                 |Group  |
|------|------|--------|-------|------------|------------|------------|------------|------------|---------|----------|-
------------|-----------|-------|---------|------|--------|----------|------------|-------------|-----------
|---------|--------------|-----------------|----------|------|------|----------|-----------------|----------------------|--
------------|--------------------------------------------------|-----------------------------------------|--------------|
10,001|U   |12   |2   |2.1164550212|0.197480252|0.477139786
1.6393152351|2.4142823813|1,213   |48,746   |0.0124818771
|0    |0   |64,316 |69,319 |0   |1,919   |2,162   |0     |176    |0     |0   |0
    |0    |0     |U  |U  |18  |3,640     |3,324        |primary cluster|pog-
35232babb1              |tct-cl186084-cog-demo-01    |     |
|10,002|U   |12   |2   |1.701079892
|0.1914391894|0.3894402226|1.3116396694|2.4490408102|1,280   |47,281   |0.0120962078
|0.003333   |0   |45,824 |80,478 |0   |1,820   |2,076   |0    |1,128    |0     |0
    |0    |0     |U  |U  |18  |3,640     |3,331      | primary
cluster|pog-35232babb1           |tct-cl186084-cog-demo-01    |     |
|20,001|U   |24   |2   |0.422856507 |0.0674623046|0.1331858899|0.289670617
|1.5801479998|176   |4,031   |0.0095513641
|0.0333845229|0   |3,265 |5,458   |0   |89   |98   |0    |8     |0     |0   |0
    |0    |0     |U  |U  |32  |8.192     |7,908        |compute
cluster|sys-35232b67ef_computegroup11_computeprofile23_7w47au|computegroup11-
computeprofile23-7w47au|computegroup11|
|20,002|U   |24   |2   |0.3380070105|0.0674623046|0.1263310132|0.2117759973|
1.5949850702|170   |4,050   |0.0104415883
|0    |0   |U  |U  |32  |8,192     |7,909         |compute cluster|sys-
35232b67ef_computegroup11_computeprofile23_7w47au|computegroup11-
computeprofile23-7w47au|computegroup11|
|20,003|U   |24   |2   |0.37973627211|0.0688532799|0.137358816
|0.2423774551|1.5282182533|166   |4,128|0.0107383297
|0.0200320513|0   |3,417 |5,269   |0   |12   |14   |0    |0     |0     |0
    |0    |0     |U  |U  |32  |8,192     |7,907         |compute
cluster|sys-35232b67ef_computegroup11_computeprofile23_7w47au|computegroup11-
computeprofile23-7w47au|computegroup11|
|20,004|U   |24   |2   |0.3432231681|0.0768513882|0.1307516831|0.212471485
|1.5541831265|171   |3,882   |0.0103488566
|0.0267094017|0   |2,205 |5,407   |0   |47   |54   |0    |4     |0     |0
    |0    |0     |U  |U  |32  |8,192     |7,910         |compute
cluster|sys-35232b67ef_computegroup11_computeprofile23_7w47au|computegroup11-
computeprofile23-7w47au|computegroup11|
|30,001|U   |24   |2   |0,4127162342|0.0696523619|0.1410373697|0.2716788645|
1.746506986|161   |4,437   |0.0119390848
|0.0066529173|0   |8,138 |3,709   |0   |45   |50   |0    |4     |0     |0
    |0    |0     |U  |U  |32  |8,192     |7,906         |compute
cluster|sys-35232b67ef_computegroup11_computeprofile23_1n21lx|computegroup11-
computeprofile23-1n21lx|computegroup11|
|30,002|U   |24   |2   |0.327816589

-continued

```
|0.0627217787|0.1237109115|0.2041056775|1.6226805648|171   |3,924  |0.0097397797
|0.0199587519|0   |3,193  |5,290  |0  |40  |46  |0   |36    |0    |0    |
0     |0     |0     |U  |U  |32  |8,192    |7,907      |compute
cluster|sys-35232b67ef_computegroup11_computeprofile23_1n21lx|computegroup11-
computeprofile23-1n21lx|computegroup11|
|30,003|U  |24  |2   |0.7058799069|0.0689593036|0.1514332446|0.5544466622|
1.6947586309|168  |4,174  |0.0106453759
|0.0332690132|0   |2,136  |5,379  |0  |55  |62    |0   |4    |0    |0    |0
     |0     |0     |U  |U  |32  |8,192    |7,906      |compute
cluster|sys-35232b67ef_computegroup11_computeprofile23_1n21lx|computegroup11-
computeprofile23-1n21lx|computegroup11|
|30,004|U  |24  |2   |0.3607368596|0.0602960745|0.1323741406|0.228362719
|1.7150883418|178  |3,874  |0.009850669  |0.0332645865|0   |3,081  |5,524  |0    |
26  |30  |0    |0     |0     |0     |0     |0    |U  |U  |32|
8.192    |7,906      |compute cluster|sys-
35232b67ef_computegroup11_computeprofile23_1n21lx|computegroup11-
computeprofile23-1n21lx|computegroup11|
|40,001|U  |24  |2   |0.4657802601|0.0712042903|0.1424085806|0.3233716794|
1.556074247 |177  |4,343  |0.0110036679
|0.0066706691|0   |7,452  |3,653  |0  |66  |74  |0   |4    |0    |0    |0
     |0     |0     |U  |U  |32  |8,192    |7,900      |compute
cluster|sys-35232b67ef_computegroup12_computeprofile24_2c5twz|computegroup12-
computeprofile24-2c5twz|computegroup12|
|40,002|U  |24  |2   |0.3473380016|0.0760670223|0.1392825386|0.2080554629|
1.626468082|170  |4,156  |0.0110221926
|0.0066706691|0   |2,026  |5,350  |0  |47  |54  |0   |32    |0    |0    |
0     |0     |0     |U  |U  |32  |8,192    |7,903      |compute
cluster|sys-35232b67ef_computegroup12_computeprofile24_2c5twz|computegroup12-
computeprofile24-2c5twz|computegroup12|
40,003|U  |24  |2   |0.3209403134|0.0739829943|0.1233049906|0.1976353229|
1.6135007966|162  |3,791  |0.009910711 |0   |0   |2,109  |5,391  |0  |34  |38
|0    |4     |0     |0     |0     |0     |0    |U  |U  |32  |8,192    |
7,904      |compute cluster|sys-
35232b67ef_computegroup12_computeprofile24_2c5twz|computegroup12-
computeprofile24-2c5twz|computegroup12|
|40,004  |U  |24  |2   |0.3601895076|0.0732883183|0.1271257086|0.233063799
|1.6190582046|160  |4,149  |0.0112630136
|0.0200106724|0   |4,690  |5,463  |0  |19  |22  |0   |4    |0    |0    |0
     |0     |0     |U  |U  |32  |8,192    |7,905      |compute
cluster|sys-35232b67ef_computegroup12_computeprofile24_2c5twz|computegroup12-
computeprofile24-2c5twz|computegroup12|
|50,001|U  |24  |2   |0.7836455372|0.0550537994|0.189552322
|0.5940932151|1.3194328297|157  |3,896  |0.0090316106
|0     |0     |7,459  |3,558  |0  |61  |68  |0   |4    |0    |0    |0
|0     |0     |U  |U  |32  |8,192    |7,899      |compute cluster|sys
35232b67ef_computegroup12_computeprofile24_xqukud|computegroup12-
computeprofile24-xqukud|computegroup12|
|50,002|U  |24  |2   |0.2930395272|0.0557506829|0.1118498077|0.1811897196|
1.2934158443|169  |3,794  |0.0089015257
|0.0135437123|0   |1,941  |5,269  |0  |37  |42   |0   |8    |0    |0    |0
     |0     |0     |U  |U  |32  |8,192    |7,905      |compute
cluster|sys-35232b67ef_computegroup12_computeprofile24_xqukud|computegroup12-
computeprofile24-xqukud|computegroup12|
|50,003|U  |24  |2   |0.3306712382|0.0634164019|0.1285750125|0.2020962257|
1.4662429615|170  |3,854  |0.0095147832
|0.0267665953|0   |2,347  |5,096  |0  |29  |34   |0   |8    |0    |0    |0
     |0     |0     |U  |U  |32  |8,192    |7,905      |compute
cluster|sys-35232b67ef_computegroup12_computeprofile24_xqukud|computegroup12-
computeprofile24-xqukud|computegroup12|
|50,004|U  |24  |2   |0.6637815688|0.0644617272|0.1449517757|0.5188297932|
1.4142089907|180  |3,855  |0.0097935366
|0.0267683865|0   |3,795  |5,159  |0  |29  |34  |0   |0    |0    |0    |0
     |0     |0     |U  |U  |32  |8,192    |7,902      |compute
cluster|sys-35232b67ef_computegroup12_computeprofile24_xqukud|computegroup12-
computeprofile24-xqukud|computegroup12|
```

Examples of SQL Queries

Resource usage while query is running:

```
SELECT ProcID, CPUUse, Id, "Type" from
SYSLIB.MonitorPhysicalResourceSV(
    USING
        details('1')
)
AS dt;
```

Displaying basic configuration:

```
SELECT "TYPE"          AS COMPONENT_TYPE
    ,ID                AS COMPONENT_ID
    ,COUNT(*)          AS NODE_CNT
    ,SUM(AMPCOUNT)     AS AMP_CNT
    ,SU(PECOUNT)       AS PE_CNT
FROM MONITORPHYSICALRESOURCESV(
    USING DETAILS('1')
) AS DT
```

-continued

```
        GROUP BY 1,2
        ORDER BY 1,2
        ;
```

Identifying status of all nodes:

```
SELECT "TYPE"          AS COMPONENT_TYPE
     ,ID               AS COMPONENT_ID
     ,SUM(CASE WHEN STATUS = 'U' THEN 1 ELSE 0 END) AS
NODES_ONLINE
     ,SUM(CASE WHEN STATUS = 'D' THEN 1 ELSE O END) AS
NODES_OFFLINE
FROM MONITORPHYSICALRESOURCESV(
     USING DETAILS('1')
     ) AS DT
GROUP BY 1,2
ORDER BY 1,2
;
```

Identifying all connected sessions:

```
        SELECT *
          FROM MONITORSESSIONSV(
              USING HOSTID(-1')
                  USERNAME('+')
                  SESSIONID('0')
              ) AS DT;
```

Determining sessions states:

```
        SELECT AMPSTATE
          FROM MONITORSESSIONV(
              USING HOSTID(-1')
                  USERNAME('+')
                  SESSIONID('0')
              ) AS DT
          GROUP BY AMPSTATE
          ORDER BY AMPSTATE
          ;
```

Identifying blocked sessions:

```
    SELECT USERNAME
         ,SESSIONNO        AS BLKD_SESS_NO
         ,USERNAME
         ,BLK1SESSNO       AS FIRST_BLKG_SESS_NO
         ,BLK1USERID       AS FIRST_BLKG_USER_ID
         ,BLK1LMODE        AS FIRST_BLKG_LOCK_TYPE
         ,BLK2SESSNO       AS SECOND_BLKG_SESS_NO
         ,BLK2USERID       AS SECOND_BLKG_USER_ID
         ,BLK2LMODE        AS SECOND_BLKG_LOCK_TYPE
         ,BLK3SESSNO       AS THIRD_BLKG_SESS_NO
         ,BLK3USERID       AS THIRD_BLKG_USER_ID
         ,BLK3LMODE        AS THIRD_BLKG_LOCK_TYPE
      FROM MONITORSESSIONV(
          USING HOSTID(-1')
              USERNAME('+')
              SESSIONID('0')
          ) AS DT
      WHERE AMPSTATE = 'BLOCKED'
      ORDERBY USERNAME
      ;
```

Tracking query execution across clusters:

```
/*Map session on primary to session on compute*/
SELECT          HostId,
                UserName,
                SessionNo,
                LogonPENo,
                ParentSessionNo,
                ID
From MonitorSessionSV(
    USING
    details('1')
AS dt;
/*See what steps are executing in the compute session*/
SELECT * FROM MonitorSQLStepsSV(
    USING
                HostIdIn('<compute_host_id_from_previous>')
                SessionNoIn('<compute_session_from_previous")
                RunVProcNo('<compute_LogonPENo_from_previous")
                Details('1')
) AS dt;
/*View current step executing in the compute session*/
SELECT * from MonitorSQLCurrentStepSV(
    USING
                HostIDIn('10001')
                SessionNoIn('1316')
                RunVProcNo('30717')
                Details('1')
) AS dt;
/* View SQL associated with current step executing in the compute
session*/
SELECT * from MonitorSQLTextSV(
    USING
                HostIDIn('10001')
                SessionNoIn('1316')
                RunVProcNo('30717')
                Details('1')
) AS dt;
```

Below is a specific example that demonstrates session mapping across the compute clusters 706 to track queries across compute clusters 706. This is a popular use case where clients would like to track which compute cluster(s) execute their query. This can be done using the MonitorSessionSV API. Note the ParentSessionNo column in the output below for the following API.

```
SELECT HostID, UserName, SessionNo, LogonPENo, ParentSessionNo,
Id
From MonitorSessionSV(
    USING
    Details('1')
) AS dt;
```

| HostId | UserName | Session No | LogonPE No | Parent Session No | Id |
|---|---|---|---|---|---|
| 1 | SAS_USER1 | 1,025 | 30,718 | 0 | pog-64ccddff53 |
| 1 | VIM | 2,009 | 30,718 | 0 | pog-64ccddff53 |
| 1 | VIM | 2,011 | 30,718 | 0 | pog-64ccddff53 |
| 1 | VIM | 2,013 | 30,718 | 0 | pog-64ccddff53 |
| 1 | VIM | 2,015 | 30,718 | 0 | pog-64ccddff53 |
| 1 | SAS_USER2 | 2,016 | 30,718 | 0 | pog-64ccddff53 |
| 1 | SAS_USER3 | 1,022 | 30,719 | 0 | pog-64ccddff53 |
| 1 | SAS_USER3 | 1,024 | 30,719 | 0 | pog-64ccddff53 |
| 1 | SAS_USER4 | 1,973 | 30,719 | 0 | pog-64ccddff53 |
| 1 | VIM | 2,010 | 30,719 | 0 | pog-64ccddff53 |
| 10,001 | SAS_USER3 | 1,003 | 30,716 | 0 | sys-64ccdd3a19_computegroup1_computeprofile1_zioqep |
| 10,001 | SAS_USER4 | 1,822 | 30,716 | 0 | sys-64ccdd3a19_computegroup1_computeprofile1_zioqep |
| 10,001 | SAS_USER5 | 1,002 | 30,717 | 0 | sys-64ccdd3a19_computegroup1_computeprofile1_zioqep |
| 10,001 | SAS_USER6 | 1,316 | 30,717 | 2,013 | sys-64ccdd3a19_computegroup1_computeprofile1_zioqep |
| 10,001 | SAS_USER7 | 1,001 | 30,718 | 0 | sys-64ccdd3a19_computegroup1_computeprofile1_zioqep |
| 10,001 | SAS_USER8 | 1,048 | 30,718 | 0 | sys-64ccdd3a19_computegroup1_computeprofile1_zioqep |
| 10,001 | SAS_USER4 | 1,821 | 30,719 | 0 | sys-64ccdd3a19_computegroup1_computeprofile1_zioqep |

The output above indicates that the Primary Cluster session of 2013, run by the user ""VJ"" is being executed by the service account ""SAS USER6"" in the Compute instance ""sys-64ccdd3a19_computegroup1_computeprofile1_zioqe"" with a session number 1,316. With this information, it is possible to drill into this compute session to get more details, such as the current SQL step associated with this.

Once the result set has been gathered by the SOVPMAPI 710, it can be used by the primary cluster 704 or the SQL client to perform performance management tasks.

For example, the primary cluster may use a performance monitoring query (PM query), such as those listed below, to monitor overall performance of the CloudLake Tenant 702. For example, using data gathered from across the Cloud-Lake Tenant using the techniques described herein, the DW 102 may detect that one of the compute clusters 604 is in danger of not satisfying its performance goals because it has become resource bound. The DW 102 may shift some of the processing from the resource-bound compute cluster to a different compute cluster or to the primary cluster. Alternatively, the DW 102 may acquire additional compute cluster resources for the CloudLake Tenant 702 and shift work away from the resource-bound compute cluster to the added compute cluster or clusters. Further, the DW 102 may factor the limitations of the resource-bound compute cluster into future query planning.

As another alternative, rather than shifting work away from the resource-bound compute cluster, the DW may augment the resources of the resource-bound compute clus-ter, i.e. auto-scale the compute cluster, to eliminate or ameliorate the problem, now and in the future.

As another example, the DW 102 may use a PM query to monitor execution of a business request (i.e., a query, workload, or other type of request the SQL client runs as part of its business). Using the techniques described herein, the PM query may run in parallel with the business request to produce real time improvements in query processing.

Figure 9:
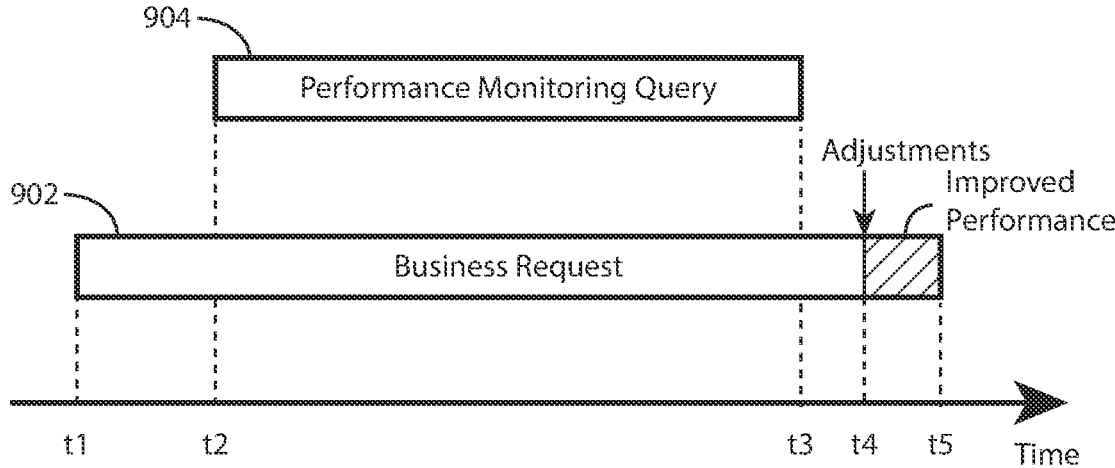
FIG. 9 illustrates the real time collection of performance monitoring data using a performance monitoring query while a business request is being executed.

FIG. 9 illustrates the real time collection of performance monitoring data using a performance monitoring query while a business request is being executed. As can be seen, a business request 902 begins execution at time t1. Perhaps suspecting a performance issue, the SQL client initiates a PM query 904 at time t2. The PM query 904 executes until time t3. The DW 102 or the SQL client make adjustments to the CloudLake Tenant 702, to the query, to the distribution of data, or to the complement of processors available to the primary cluster 704 or the compute clusters 706, at time t4, resulting in improved performance from time t4 to time t5.

The adjustments the DW 102 may make include, for example, identifying query issues to the SQL client 800 with recommended adjustments to the query to avoid or lessen the problem, or, in the case of data availability, causing data to be transferred from its current location to the compute cluster where it is needed or changing the allocation of work so that work on data is more likely to be performed on the cluster where the data resides.

By employing the techniques described herein it is pos-sible to improve query execution in real-time, rather than looking back and performing a postmortem after query execution is complete. The techniques described herein allow the following functionality:

Tracking resource usage across primary and compute clusters while a query is running, Displaying basic configuration information across primary and compute clusters, Identifying status of all nodes by cluster, Identifying all connected sessions across the primary and compute clusters; determining what sessions are in specific states, Identifying sessions that are blocked, and Tracking query execution between the primary cluster and compute clusters and track progress in query execution.

Further examples consistent with the present teaching are set out in the following numbered clauses.

Clause 1. A method comprising:

executing a plurality of processes in a CloudLake tenant, wherein the CloudLake tenant includes:

a primary cluster executing a single operational view performance monitoring application program interface (SOVPMAPI), a compute cluster, a federator compute cluster executing a federator application program interface (FAPI), and a cloud object storage;

wherein the primary cluster and the compute cluster each execute a fast path performance monitoring application program interface (FPPMAPI), wherein each FPPMAPI provides performance monitoring information regarding only the respective cluster it is executing on;

a data warehouse executing as at least one of a plurality of processes on the primary cluster;

the data warehouse configured to issue executable steps to processes executing as part of the data warehouse on the compute cluster, the data warehouse receiving a performance monitoring (PM) query from a client requesting data warehouse performance monitoring information;

the SOVPMAPI converting the performance monitoring query into a call to the FAPI to gather the data warehouse performance monitoring information requested in the performance monitoring query;

the FAPI requesting database performance monitoring information from the FPPMAPIs, receiving the requested data warehouse performance monitoring information, compiling a response to the call from the SOVPMAPI, and sending the compiled response to the SOVPMAPI; and the SOVPMAPI preparing a result set and providing it to the client.

Clause 2. The method of claim 1 further comprising a POD Agent that, upon request from the FAPI, provides a layout of the compute clusters.

Clause 3. The method of any of the preceding clauses further comprising the data warehouse receiving a business request to execute and executing the business request on the CloudLake tenant, wherein execution of the PM query begins after execution of the business request.

Clause 4. The method of any of the preceding clauses wherein the result set prepared by the SOVPMAPI includes information regarding execution of the business request.

Clause 5. The method of any of the preceding clauses wherein the data warehouse adjusts execution of the business request in real time while the business request is executing in response to the performance information gathered by the PM query.

Clause 6. The method of any of the preceding clauses wherein the data warehouse adjusts the CloudLake tenant in response to the performance information gathered by the PM query.

Clause 7. The method of any of the preceding clauses wherein the data warehouse adjusts the CloudLake tenant by redistributing data among the primary cluster and the compute cluster to address issues identified in the performance information gathered by the PM query.

Clause 8. The method of any of the preceding clauses wherein the data warehouse adjusts the CloudLake tenant by changing resource allocations among the primary cluster and the compute cluster to address issues identified in the performance information gathered by the PM query.

Clause 9. The method of any of the preceding clauses where in the performance monitoring query is a Structured Query Language (SQL) query.

Clause 10. A non-transitory computer-readable tangible medium, on which is recorded a computer program, the computer program comprising executable instructions, that, when executed, perform a method comprising:

executing a plurality of processes in a CloudLake tenant, wherein the CloudLake tenant includes:

a primary cluster executing a single operational view performance monitoring application program interface (SOVPMAPI), a compute cluster, a federator compute cluster executing a federator application program interface (FAPI), and a cloud object storage;

wherein the primary cluster and the compute cluster each execute a fast path performance monitoring application program interface (FPPMAPI), wherein each FPPMAPI provides performance monitoring information regarding only the respective cluster it is executing on;

a data warehouse executing as at least one of a plurality of processes on the primary cluster;

the data warehouse configured to issue executable steps to processes executing as part of the data warehouse on the compute cluster, the data warehouse receiving a performance monitoring (PM) query from a client requesting data warehouse performance monitoring information;

the SOVPMAPI converting the performance monitoring query into a call to the FAPI to gather the data warehouse performance monitoring information requested in the performance monitoring query;

the FAPI requesting database performance monitoring information from the FPPMAPIs, receiving the requested data warehouse performance monitoring information, compiling a response to the call from the SOVPMAPI, and sending the compiled response to the SOVPMAPI; and the SOVPMAPI preparing a result set and providing it to the client.

Clause 11. The method of clause 10 further comprising a POD Agent that, upon request from the FAPI, provides a layout of the compute clusters.

Clause 12. The method of any of clauses 10-11 further comprising the data warehouse receiving a business request to execute and executing the business request on the CloudLake tenant, wherein execution of the PM query begins after execution of the business request.

Clause 13. The method of any of clauses 10-12 wherein the result set prepared by the SOVPMAPI includes information regarding execution of the business request.

Clause 14. The method of any of clauses 10-13 wherein the data warehouse adjusts execution of the business request in real time while the business request is executing in response to the performance information gathered by the PM query.

Clause 15. The method of any of clauses 10-14 wherein the data warehouse adjusts the CloudLake tenant in response to the performance information gathered by the PM query.

Clause 16. The method of any of clauses 10-15 wherein the data warehouse adjusts the CloudLake tenant by redistributing data among the primary cluster and the compute cluster to address issues identified in the performance information gathered by the PM query.

Clause 17. The method of any of clauses 10-16 wherein the data warehouse adjusts the CloudLake tenant by changing resource allocations among the primary cluster and the compute cluster to address issues identified in the performance information gathered by the PM query.

Clause 18. The method of any of clauses 10-17 where in the performance monitoring query is a Structured Query Language (SQL) query.

Clause 19. A system comprising:

a CloudLake tenant executing a plurality of processes,
  wherein the CloudLake tenant includes:
    a primary cluster executing a single operational view
      performance monitoring application program
      interface (SOVPMAPI),
    a compute cluster,
    a federator compute cluster executing a federator
      application program interface (FAPI), and
    a cloud object storage;
    wherein the primary cluster and the compute cluster
      each execute a fast path performance monitoring
      application program interface (FPPMAPI),
      wherein each FPPMAPI provides performance
      monitoring information regarding only the respective cluster it is executing on;
a data warehouse executing as at least one of a plurality
  of processes on the primary cluster;
the data warehouse configured to issue executable steps to
  processes executing as part of the data warehouse on
  the compute cluster,
the data warehouse receiving a performance monitoring
  (PM) query from a client requesting data warehouse
  performance monitoring information;
the SOVPMAPI converting the performance monitoring
  query into a call to the FAPI to gather the data warehouse performance monitoring information requested
  in the performance monitoring query;
the FAPI requesting database performance monitoring
  information from the FPPMAPIs, receiving the
  requested data warehouse performance monitoring
  information, compiling a response to the call from the
  SOVPMAPI, and sending the compiled response to the
  SOVPMAPI; and
the SOVPMAPI preparing a result set and providing it to
  the client.

Clause 20. The system of clause 19 further comprising the data warehouse receiving a business request to execute and executing the business request on the CloudLake tenant, wherein execution of the PM query begins after execution of the business request.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:

executing a plurality of processes in a CloudLake tenant,
  wherein the CloudLake tenant includes:
    a primary cluster executing a single operational view
      performance monitoring application program
      interface (SOVPMAPI),
    a compute cluster,
    a federator compute cluster executing a federator
      application program interface (FAPI), and
    a cloud object storage;
    wherein the primary cluster and the compute cluster
      each execute a fast path performance monitoring
      application program interface (FPPMAPI),
      wherein each FPPMAPI provides performance
      monitoring information regarding only the respective cluster it is executing on;
a data warehouse executing as at least one of a plurality
  of processes on the primary cluster;
the data warehouse configured to issue executable steps to
  processes executing as part of the data warehouse on
  the compute cluster,
the data warehouse receiving a performance monitoring
  (PM) query from a client requesting data warehouse
  performance monitoring information;
the SOVPMAPI converting the performance monitoring
  query into a call to the FAPI to gather the data warehouse performance monitoring information requested
  in the performance monitoring query;
the FAPI requesting database performance monitoring
  information from the FPPMAPIs, receiving the
  requested data warehouse performance monitoring
  information, compiling a response to the call from the
  SOVPMAPI, and sending the compiled response to the
  SOVPMAPI; and
the SOVPMAPI preparing a result set and providing it to
  the client.

2. The method of claim 1 further comprising a POD Agent that, upon request from the FAPI, provides a layout of the compute clusters.

3. The method of claim 1 further comprising the data warehouse receiving a business request to execute and executing the business request on the CloudLake tenant, wherein execution of the PM query begins after execution of the business request.

4. The method of claim 3 wherein the result set prepared by the SOVPMAPI includes information regarding execution of the business request.

5. The method of claim 4 wherein the data warehouse adjusts execution of the business request in real time while the business request is executing in response to the performance information gathered by the PM query.

6. The method of claim 1 wherein the data warehouse adjusts the CloudLake tenant in response to the performance information gathered by the PM query.

7. The method of claim 6 wherein the data warehouse adjusts the CloudLake tenant by redistributing data among the primary cluster and the compute cluster to address issues identified in the performance information gathered by the PM query.

8. The method of claim 6 wherein the data warehouse adjusts the CloudLake tenant by changing resource allocations among the primary cluster and the compute cluster to address issues identified in the performance information gathered by the PM query.

9. The method of claim 1 where in the performance monitoring query is a Structured Query Language (SQL) query.

10. A non-transitory computer-readable tangible medium, on which is recorded a computer program, the computer program comprising executable instructions, that, when executed, perform a method comprising:

executing a plurality of processes in a CloudLake tenant, wherein the CloudLake tenant includes:
   a primary cluster executing a single operational view performance monitoring application program interface (SOVPMAPI),
   a compute cluster,
   a federator compute cluster executing a federator application program interface (FAPI), and
   a cloud object storage;
   wherein the primary cluster and the compute cluster each execute a fast path performance monitoring application program interface (FPPMAPI), wherein each FPPMAPI provides performance monitoring information regarding only the respective cluster it is executing on;
a data warehouse executing as at least one of a plurality of processes on the primary cluster;
the data warehouse configured to issue executable steps to processes executing as part of the data warehouse on the compute cluster,
the data warehouse receiving a performance monitoring (PM) query from a client requesting data warehouse performance monitoring information;
the SOVPMAPI converting the performance monitoring query into a call to the FAPI to gather the data warehouse performance monitoring information requested in the performance monitoring query;
the FAPI requesting database performance monitoring information from the FPPMAPIs, receiving the requested data warehouse performance monitoring information, compiling a response to the call from the SOVPMAPI, and sending the compiled response to the SOVPMAPI; and
the SOVPMAPI preparing a result set and providing it to the client.

11. The non-transitory computer-readable tangible medium of claim 10, wherein the method further comprising a POD Agent that, upon request from the FAPI, provides a layout of the compute clusters.

12. The non-transitory computer-readable tangible medium of claim 10, wherein the method further comprising the data warehouse receiving a business request to execute and executing the business request on the CloudLake tenant, wherein execution of the PM query begins after execution of the business request.

13. The non-transitory computer-readable tangible medium of claim 12 wherein the result set prepared by the SOVPMAPI includes information regarding execution of the business request.

14. The non-transitory computer-readable tangible medium of claim 12 wherein the data warehouse adjusts execution of the business request in real time while the business request is executing in response to the performance information gathered by the PM query.

15. The non-transitory computer-readable tangible medium of claim 10 wherein the data warehouse adjusts the CloudLake tenant in response to the performance information gathered by the PM query.

16. The non-transitory computer-readable tangible medium of claim 15 wherein the data warehouse adjusts the CloudLake tenant by redistributing data among the primary cluster and the compute cluster to address issues identified in the performance information gathered by the PM query.

17. The non-transitory computer-readable tangible medium of claim 15 wherein the data warehouse adjusts the CloudLake tenant by changing resource allocations among the primary cluster and the compute cluster to address issues identified in the performance information gathered by the PM query.

18. The non-transitory computer-readable tangible medium of claim 10 wherein the performance monitoring query is a Structured Query Language (SQL) query.

19. A system comprising:

a CloudLake tenant executing a plurality of processes, wherein the CloudLake tenant includes:
   a primary cluster executing a single operational view performance monitoring application program interface (SOVPMAPI),
   a compute cluster,
   a federator compute cluster executing a federator application program interface (FAPI), and
   a cloud object storage;
   wherein the primary cluster and the compute cluster each execute a fast path performance monitoring application program interface (FPPMAPI), wherein each FPPMAPI provides performance monitoring information regarding only the respective cluster it is executing on;
a data warehouse executing as at least one of a plurality of processes on the primary cluster;
the data warehouse configured to issue executable steps to processes executing as part of the data warehouse on the compute cluster,
the data warehouse receiving a performance monitoring (PM) query from a client requesting data warehouse performance monitoring information;
the SOVPMAPI converting the performance monitoring query into a call to the FAPI to gather the data warehouse performance monitoring information requested in the performance monitoring query;
the FAPI requesting database performance monitoring information from the FPPMAPIs, receiving the requested data warehouse performance monitoring information, compiling a response to the call from the SOVPMAPI, and sending the compiled response to the SOVPMAPI; and
the SOVPMAPI preparing a result set and providing it to the client.

20. The system of claim 19 further comprising the data warehouse receiving a business request to execute and executing the business request on the CloudLake tenant, wherein execution of the PM query begins after execution of the business request.

* * * * *